United States Patent [19]

Dvornic et al.

[11] Patent Number: 6,077,500

[45] Date of Patent: Jun. 20, 2000

[54] HIGH GENERATION RADIALLY LAYERED DENDRIMERS

[75] Inventors: Petar R. Dvornic, Midland, Mich.; Agnes M. deLeuze-Jallouli, Clearwater, Fla.; Michael James Owen, Midland; Susan Victoria Perz, Essexville, both of Mich.

[73] Assignees: Dow Corning Corporation; Dendritech, Incorporated, both of Midland, Mich.

[21] Appl. No.: 09/272,096

[22] Filed: Mar. 18, 1999

[51] Int. Cl.$^7$ .......................... C08F 283/00; C08L 71/00
[52] U.S. Cl. ............................ 424/DIG. 16; 525/424; 525/426; 525/430; 525/431; 525/474; 525/487; 525/417
[58] Field of Search ................... 424/DIG. 16; 525/424, 525/426, 430, 431, 417, 487, 474

[56] References Cited

U.S. PATENT DOCUMENTS

| | | | |
|---|---|---|---|
| 4,568,737 | 2/1986 | Tomalia | 528/332 |
| 4,713,975 | 12/1987 | Tomalia | 73/865 |
| 4,737,550 | 4/1988 | Tomalia | 525/418 |
| 5,387,617 | 2/1995 | Hedstrand | 521/79 |
| 5,393,795 | 2/1995 | Hedstrand | 521/134 |
| 5,393,797 | 2/1995 | Hedstrand | 521/134 |
| 5,560,929 | 10/1996 | Hedstrand | 424/486 |
| 5,739,218 | 4/1998 | Dvornic | 525/487 |

OTHER PUBLICATIONS

P.R. Dvornic and D.A. Tomalia, "Molecules That Grow Like Trees, Dendritic Polymers: The Fourth Major Class of Macromolecular Architecture", Science Spectra, No. 5, pp. 36–41, (1996).
P.R. Dvornic and D.A. Tomalia, "Dendritic Polymers, Divergent Syntesis (Starburst (R) Polyamidamine Dendrimers)", in "The Polymeric Materials Encyclopedia", J.C. Salamone, ED., CRC Press Inc., Boca Raton, vol. 3, pp. 1814–1830, (1996).
P.R. Dvornic and D.A. Tomalia, "Recent Advances in Dendritic Polymers", Current Opinion in Colloid and Interface Science, vol. 1, Issue 2, pp. 221–235.
P.R. Dvornic, "Some Recent Advances in the Silicon Containing Polymers", Materials Science Forum, vol. 214, pp. 131–138, (1996).
I. Gitsov, K. Wooley, C.J. Hawker, P.T. Ivanova and J.M. Frechet, Macromolecules, 26, pp. 5621–5627, (1993).
T.M. Chapman, G. Hillyer, E.J. Mahan and K.A. Shaffer, J. Amer. Chem. Soc., 116, pp. 1195–1196, (1994).
T.M. Chapman and E.J. Mahan, Polymer Preprints, 73, pp. 275–276, (1995).
E.J. Mahan and T.M. Chapman, Polymer Preprints, 37(2), p. 247, (1996).
K. Lorenz, R. Mulhaupt, H. Frey, U. Rapp and F.J. Mayer–Posner, Macromolecules, 28, pp. 6657–6661, (1995).
A.W. Adamson, Physical Chemistry of Surfaces, 4th Ed., John Wiley & Sons, New York, pp. 70–78, (1982).
W. Noll, H. Steinbach and C. Sucker, Prog. Colloid Polym. Sci., 55, pp. 131–141, (1971).

D.A. Tomalia, "Dendritic Molecules", Sci. Amer., 272, pp. 62–66, (1995).
P. R. Dvornic and D.A. Tomalia, Macromol. Symp., 88, p. 123, (1994).
D.A. Tomalia et. al., "Proceedings of the 1st SPSJ International Polymer Conference", Kyoto, Japan, p. 65, (1984).
L.J. Mathias and T.W. Carothers, in "Advances in Dendritic Macromolecules", G.R. Newkome, Ed., JAI Press Inc., Greenwich, p. 101, (1995).
E.A. Rebrov, A.M. Muzafarov, V.S. Papkov and A.A. Zdanov, Dokl. Akad. Nauk. SSSR, 309, p. 376, (1989).
A. Morikawa, M. Kakimoto and Y. Imai, Macromolecules, 24, p. 3469, (1991).
A.W. van der Maade and P.W.N.M. van Leeuwen, J. Chem. Soc., Chem. Commun., p. 1400, (1992).
J.B. Lambert, J.L. Pflug and C.L. Stern, Angew. Chem. Int. Ed. Engl., 34, p. 98, (1995).
A. Sekiguchi, M. Nanjo, C. Kabuto and H. Sakurai, J. Am. Chem. Soc., 117, p. 4195, (1995).
H. Suzuki, Y. Kimata and A. Kuriyama, Chem. Lett., p. 293, (1995).
M.C. Coen, K. Lorenz, J. Kressler, H. Frey and R. Mulhaupt, Macromolecules, 29, p. 8069, (1996).
D. Seyferth et. al., Organometallics, 13, p. 2682, (1994).
D. Seyferth et. al., Organometallics, 14, p. 5362, (1995).
J. Roovers et. al., Macromolecules, 26, p. 4324, (1993).
G.R. Newkome, C.N. Moorefield and F. Vogtle, "Dendritic Molecules", VCH Publishers, Weinheim, (1996).
D.A. Tomalia et. al., Polymer J., 17, p. 117, (1985).
S. Watanabe and S. Regen, J. Am. Chem. Soc., 116, p. 8855, (1994).
M.J. Michalczyk and K.G. Sharp, "29th Organosilicon Symposium", Evanston, Illinois, Mar. 22–23, 1996.
"Molecular Electronics: Biosensors and Biocomputers", F.T. Hong, Ed., Plenum, New York, (1989).
"Molecular Electronic Devices", F.L. Carter, Ed., Dekker, New York, vol. 1, (1982).
"Molecular Electronic Devices", F.L. Carter, Ed., Dekker, New York, vol. 2, (1987).
D.A. Tirrell et. al., Chem. Eng. News, 12/19, p. 40, (1994).
J. Zhang and J.S. Moore, J. Am. Chem. Soc., 116, p. 2655, (1994).

(List continued on next page.)

*Primary Examiner*—Ana Woodward
*Attorney, Agent, or Firm*—James L. De Cesare

[57] ABSTRACT

Higher generation radially layered copolymeric dendrimers having a hydrophilic poly(amidoamine) or a hydrophilic poly(propyleneimine) interior and a hydrophobic organosilicon exterior are prepared by first reacting a hydrophilic dendrimer having —NH$_2$ surface groups with an organosilicon compound, and then hydrosilating the resulting copolymeric dendrimer with another organosilicon compound in the presence of a noble metal catalyst. In an alternate embodiment, the radially layered copolymeric dendrimers are prepared by reacting a hydrophilic dendrimer having —NH$_2$ surface groups directly with an organosilicon dendron or organosilicon hyperbranched polymer.

22 Claims, No Drawings

OTHER PUBLICATIONS

G.R. Desirajer, Angew. Chem., 107, p. 2541, (1995).

G.R. Desirajer, Angew. Chem Int. Ed. Engl., 34, p. 2311, (1995).

Dvornic et. al., "Preparation & Evaluation of Radially Layered PAMAMOS Dendrimers", Polym. Mater. Sci. Eng., vol. 77, pp. 67–68, (1997).

Dvornic et. al., "Surface Properties of Radially Layered PAMAMOS Dendrimers", Polym. Mater. Sci. Eng., vol. 77, pp. 93–94, (1997).

Dvornic, P.R.; de Leuze–Jallouli, A.M.; Owen, M.J.; Perz S.V., Polym. Preprints, 1998, 39(1), 473.

Hawker, C.J.; Frechet, J.M.J., J. Am. Chem. Soc., 1992, 114, 8405.

Tomalia, D.A.; Naylor, A.M.; Goddard III, W.A., Angew. Chem. Int. Ed. Engl., 1990, 29, 138.

Tomalia, D.A.; Durst, H.D., Topics Curr. Chem., 1993, 165, 193.

van der Made, A.W.; van Leeuwen, P.W.N.M.; deWilde, J.C.; Brandes, R.A.C., Adv. Mater., 1993, 5, 466.

Nanjo, M.; Sekiguchi, A., Organometallics, 1998, 17, 492.

Hawker, C.J.; Frechet, J.M.J., "Three–Dimensional Dendritic Macromolecules: Design, Synthesis and Properties", Chapter 8 in "New Methods of Polymer Synthesis", Ebdon, J.R.; Eastmond, G.C., Eds., Blackie Academic and Professional, London, UK, 1995, vol. 2, pp. 290–330.

HIGH GENERATION RADIALLY LAYERED DENDRIMERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to high generation radially layered poly(amidoamine-organosilicon) $PAMAM_xOS_y$ and poly(propyleneimine-organosilicon) $PPI_mOS_n$ dendrimers.

In particular, it relates to improvements in dendrimers and to the methods of making such dendrimers which are of the type generally described in U.S. Pat. No. 5,739,218 (Apr. 14, 1998), assigned to Dow Corning Corporation and Michigan Molecular Institute, both of Midland, Mich. USA, which are assignees of the present invention.

BACKGROUND OF THE INVENTION

In U.S. Pat. No. 5,739,218, there is described what is believed to be the first family of radially layered poly (amidoamine-organosilicon) $PAMAM_xOS_y$ dendrimers, which contain concentric layers, i.e., generations, of hydrophilic poly(amidoamine) $PAMAM_x$ branch cells in their interior, and hydrophobic organosilicon (OS) branch cells in their exterior. U.S. Pat. No. 5,739,218 also describes what is believed to be the first family of radially layered poly (propyleneimine-organosilicon) $PPI_mOS_n$ dendrimers, which contain concentric layers of hydrophilic poly (propyleneimine) PPI branch cells in their interior, and hydrophobic organosilicon (OS) branch cells in their exterior.

While U.S. Pat. No. 5,739,218 specifically points out that the hydrophilic interior may constitute a generation 0 to a generation 10 poly(amidoamine) dendrimer, i.e., $PAMAM_x$ where x represents an integer from 0 to 10, or a generation 0 to a generation 5 poly(propyleneimine) dendrimer, i.e., $PPI_m$ where m represents an integer from 0 to 5, it does not specify the number of organosilicon layers or generations, i.e., y and n, respectively, in the respective dendrimer exteriors.

However, U.S. Pat. No. 5,739,218 does specify the particular organosilicon reagents, as well as the reactions, that are used in the preparation of the radially layered poly (amidoamine-organosilicon) $PAMAM_xOS_y$ and poly (propyleneimine-organosilicon) $PPI_mOS_n$ dendrimers; from which it can be deduced that the $PAMAM_xOS_y$ and $PPI_mOS_n$ dendrimers in U.S. Pat. No. 5,739,218, contain at least one but no more than two layers of $OS_y$ and $OS_n$ branch cells.

This follows from the fact that in U.S. Pat. No. 5,739,218, in reactions with the amine $NH_2$ terminated $PAMAM_x$ or $PPI_m$, $OS_y$ and $OS_n$ reagents such as (3-acryloxypropyl) methyldimethoxysilane, chloromethyltrimethylsilane, iodomethyltrimethylsilane, chloromethyldimethylvinylsilane, as well as (3-acryloxypropyl)bis(vinyldimethylsiloxy)methylsilane and (3-acryloxypropyl)tris(trimethylsiloxy)silane, are employed.

The first four of these reagents will necessarily provide $PAMAM_xOS_y$ and $PPI_mOS_n$ dendrimers with a single outermost layer of $OS_y$ and $OS_n$ branch cells, i.e., y and n=1, while the latter two reagents provide dendrimer homologues with at most two $OS_y$ and $OS_n$ branch layers in the exterior, i.e., y and n=2.

It should be noted that computer modeling studies have confirmed that experimentally observed dramatic changes in the solubility behavior of such dendrimers are the direct consequence of their degree of surface coverage by hydrophobic units such as trimethylsilyl, i.e., $-Si(CH_3)_3$ units (TMS). Thus, it can be reasonably expected that further increases in dendrimer surface coverage by $OS_y$ and $OS_n$ branch cells would lead to further changes in this and other dendrimer properties.

For example, in addition to changes in solubility behavior, other properties which can be affected include surface characteristics, such as surface tension, contact angle, and phase transport behavior; as well as properties such as Theological flow behavior, glass temperature, thermal and thermo-oxidative degradation behavior, chemical reactivity, and electrical properties.

By way of illustration, a dramatic effect of the degree of substitution of —NH end groups of a $PAMAM_x$ precursor, by methylene trimethylsilyl units, i.e., $-CH_2Si(CH_3)_3$, on the solubility of $PAMAM_xOS_y$ dendrimers, has been confirmed. Thus, it was demonstrated that an increase in hydrophobicity of the dendrimer outer surface, i.e., an increase in the degree of substitution of —NH groups by TMS units, changed the ability of an unmodified $PAMAM_x$ dendrimer to dissolve in water and methanol, into a completely new composition dependent property.

For example, a 50 to 60 percent substituted homologue, i.e., a $PAMAM_xOS_y$ dendrimer in which all end groups are at least secondary amine units, acquired the ability to dissolve in polar organic solvents such as chloroform and tetrahydrofuran (THF); the 68 percent substituted derivative lost the ability to dissolve in water; while the completely substituted dendrimer gained the completely new characteristic of being soluble in a hydrocarbon such as toluene.

Therefore, since the radially layered poly(amidoamine-organosilicon) $PAMAM_xOS_y$ and the poly(propyleneimine-organosilicon) $PPI_mOS_n$ dendrimers described in U.S. Pat. No. 5,739,218 contain only either one or two layers of the respective OS branch cells, i.e., y and n=1 or 2; and U.S. Pat. No. 5,739,218 would not enable one skilled in the art to obtain higher homologues thereof, i.e., $PAMAM_xOS_y$ or $PPI_mOS_n$ dendrimers containing at least three or more exterior layers of OS branch cells, i.e., y and n=3 or more; new methods of preparing such dendrimers were discovered in accordance with this invention.

Thus, in one embodiment of a method according to the invention, the method is based on a coupling reaction between a $PAMAM_x$ or a $PPI_m$ dendrimer with an independently prepared regular $OS_y$ or $OS_n$ dendron, or with a statistical $OS_y$ or $OS_n$ hyperbranched polymer. In resulting $PAMAM_xOS_y$ or $PPI_mOS_n$ dendrimer products according to this embodiment, the number of layers of $OS_y$ or $OS_n$ branches is regulated by the number of $OS_y$ or $OS_n$ branch cells in the $OS_y$ or $OS_n$ dendron or hyperbranched polymer used in the coupling reaction. In this regard, the products obtained from regular dendrons and statistical hyperbranched polymers are considered, for purposes herein, as being compositional analogues, which means that for the same composition, they differ only in the degree of their structural regularity.

In the other embodiment of this invention, the method is based on hydrosilation of a $PAMAM_xOS_y$ or a $PPI_mOS_n$ dendrimer of the type described in U.S. Pat. No. 5,739,218, containing vinyl or allyl groups as the end units. According to this alternate embodiment, it is possible to obtain $PAMAM_xOS_y$ or $PPI_mOS_n$ dendrimers in which y and n are three or more.

These two methods are believed to be new, and dendrimers containing $OS_y$ or $OS_n$ branches which are prepared according to these two new methods are also believed to be new. Dendrimers containing at least three or more $OS_y$ or $OS_n$ branches are believed to be new regardless of the method used in their preparation.

BRIEF SUMMARY OF THE INVENTION

This invention relates to poly(amidoamine-organosilicon) $PAMAM_xOS_y$ dendrimers containing more than two radial layers or generations "y", of hydrophobic organosilicon $OS_y$ branch cells, surrounding a hydrophilic poly(amidoamine), i.e., $(-CH_2CH_2-C(O)-N(H)-CH_2CH_2-N=)_x$ interior or core $PAMAM_x$, and to poly(propyleneimine-organosilicon) $PPI_mOS_n$ dendrimers containing more than two radial layers or generations "n" of hydrophobic organosilicon $OS_n$ branch cells surrounding a hydrophilic poly (propyleneimine) $(CH_2CH_2CH_2-N=)_m$ interior or core $PPI_m$, and to method(s) of preparation of such $PAMAM_xOS_y$ and $PPI_mOS_n$ dendrimers.

The $OS_y$ and the $OS_n$ exteriors of the dendrimers may include linkages of groups such as silylethylene $-(CH_2CH_2Si)\equiv$ and silylpropylene $-(CH_2CH_2CH_2Si)\equiv$, or the $OS_y$ and the $OS_n$ exterior may include other types of carbosilane, siloxane, carbosiloxane linking groups, or combinations thereof.

As used herein, the terms carbosilane, siloxane, and carbosiloxane are intended to mean groups containing linkages such as $\equiv Si-(CH_2)_n-Si\equiv$, $\equiv Si-O-Si\equiv$, and $\equiv Si-(CH_2)_n-SiR_2-OSi\equiv$, respectively.

The hydrophilic interior core and the hydrophobic exterior of these dendrimers are covalently bonded. The hydrophilic interior may contain any number of layers "x" from 1 to 10 in the case of PAMAMx, and any number of layers "m" from 1 to 5 in the case of PPIm. The hydrophobic exterior should preferably contain three or more "y" and "n" layers.

The outermost layer of the $OS_y$ and the $OS_n$ exterior of the dendrimer may contain inert end groups such as $R_3Si-$ where R is alkyl for example, or one or more reactive end groups, such as vinylsilyl ($H_2C=CH)Si\equiv$, allylsilyl ($H_2C=CHCH_2)Si\equiv$, and halosilyl such as chlorosilyl $ClSi\equiv$. While the inert end groups generally represents a desirable feature for synthetic products designed for particular end uses, the reactive end groups can be employed, for example, whenever it is desired to prepare precursors for the synthesis of other dendrimers or dendrimer based products.

Where the dendrimer has three or more $OS_y$ layers or $OS_n$ layers in the exterior, it is distinguished from dendrimers already described in U.S. Pat. No. 5,739,218, in which the number of exterior OS layers was limited to no more than two layers, by the methods of synthesis which were used.

The synthesis of $PAMAM_xOS_y$ and $PPI_mOS_n$ dendrimers according to this invention is a multi-stage process, and it includes divergent and convergent growth procedures. In the divergent growth procedure, dendritic growth is from the initiator core, and it progresses outward in a radial direction from the core to the surface. In the convergent growth procedure, the growth process begins from what will later in the synthesis become the dendron surface, and it progresses in a radial molecular direction inward or toward the focal point. These synthetic procedures are described in detail in *Polymeric Materials Encyclopedia*, Volume 3 D–E, "Dendritic Polymers, Divergent Synthesis (Starburst Polyamidoamine Dendrimers)", Tomalia & Dvornic, Pages 1814–1830, CRC Press Inc., (1996).

In the first stage of the process described herein, commercially available $PAMAM_x$ and $PPI_m$ dendrimers are employed. $PAMAM_x$ dendrimer precursors which can be used in making dendrimers according to methods of the invention are produced and are commercially available from Dendritech Incorporated, a subsidiary of the Michigan Molecular Institute, in Midland, Michigan. $PPI_m$ dendrimer precursors, also referred to as $POPAM_m$ dendrimers, which can be used in making dendrimers according to methods of the invention are produced and are commercially available from DSM N.V., Geleen, The Netherlands.

Synthetic procedures for making $PAMAM_x$ and $PPI_m$ dendrimer precursors are also described in detail in the *Polymeric Materials Encyclopedia* referred to above, and in *Macromolecular Symposium*, Volume 88, "Starburst Dendrimers: A Conceptual Approach to Nanoscopic Chemistry and Architecture", Tomalia & Dvornic, Pages 123–148, (1994); both incorporated herein by reference.

In the second stage, the process in one embodiment, requires independent synthesis of $OS_y$ and $OS_n$ dendrons, by an appropriate divergent or convergent methodology. In addition to having multiple layers of organosilicon branch cells in their composition, such $OS_y$ and $OS_n$ dendrons must also contain functionalized focal groups which are capable of reacting with end groups present in the $PAMAM_x$ and $PPI_m$ dendrimers.

If a very high degree of structural regularity of the final product of the synthesis is not a critical or a desirable feature, the $OS_y$ and $OS_n$ dendron can be replaced with a less regular $OS_y$ or $OS_n$ hyperbranched polymer which has equivalent structural features, i.e., average number of branch cell layers, composition, and type of focal group and end groups. In either case, the dendrons or hyperbranched polymers selected may be prepared by any of several methods known in the art.

In the third and final stage of the preparation, reactive $OS_y$ and $OS_n$ dendrons or $OS_y$ and $OS_n$ hyperbranched polymers are covalently attached to the $PAMAM_x$ or the $PPI_m$ dendrimers by the reaction of the focal groups of the dendron or hyperbranched polymer and the end units of the dendrimer precursors, yielding multi-layered, block, hydrophilic/hydrophobic, covalently bonded, inverted-micelle-type, nanoscopic, copolymeric, $PAMAM_xOS_y$ and $PPI_mOS_n$ dendrimers.

The properties of these new dendrimers depend upon their composition which can be tailored using a number of different structural and compositional features, among which are one or more of the following:

i. the selection of the $PAMAM_x$ or the $PPI_m$ precursor for the $PAMAM_xOS_y$ or the $PPI_mOS_n$ interior;

ii. the number of the generations of the $PAMAM_x$ and the $PPI_m$ dendrimer precursor, and the number of the $OS_y$ and $OS_n$ branch cell layers, i.e., x, y, m, and n, in the $PAMAM_xOS_y$ and the $PPI_mOS_n$ dendrimer, and their relative ratios;

iii. the chemical composition of the $OS_y$ and the $OS_n$ branch cells, and the regularity of their distribution, i.e., regular dendrons or random hyperbranched blocks in the $PAMAM_xOS_y$ and the $PPI_mOS_n$ exterior; and iv. the degree of substitution of the end groups of the PAMAM$_x$ and PPI$_m$ precursor, i.e., the effective degree of their surface modification.

The invention also relates to a method of making a radially layered copolymeric dendrimer having a hydrophilic poly(amidoamine) or a hydrophilic poly(propyleneimine) interior and a hydrophobic organosilicon exterior by (i) preparing a copolymeric dendrimer by reacting a hydrophilic dendrimer having —NH$_2$ surface groups with an organosilicon compound to form a copolymeric dendrimer having a hydrophobic organosilicon exterior containing at least one layer of organosilicon branch cells; and (ii) hydrosilating the copolymeric dendrimer containing at least one layer of organosilicon branch cells with an organosilicon compound in the presence of a noble metal catalyst, to provide at least one additional layer of organosilicon branch cells on the hydrophobic organosilicon exterior of the copolymeric dendrimer.

An additional feature of the invention is a dendrimer-noble metal composite prepared by (i) first making a radially layered copolymeric dendrimer having a hydrophilic poly(amidoamine) or a hydrophilic poly(propyleneimine) interior and a hydrophobic organosilicon exterior by reacting a hydrophilic dendrimer having —NH$_2$ surface groups with an organosilicon compound to form a copolymeric dendrimer having a hydrophobic organosilicon exterior containing at least one layer of organosilicon branch cells; and then (ii) contacting the copolymeric dendrimer containing at least one layer of organosilicon branch cells with a noble metal catalyst to form a dendrimer-noble metal composite in which the noble metal catalyst is complexed, encapsulated, or otherwise non-covalently bonded in the hydrophilic poly(amidoamine) or hydrophilic poly(propyleneimine) dendrimer interior.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

As used herein, the terms dendrimer, dendron, and hyperbranched polymer, have the following meaning.

Dendrimers are globular, nano-scale macromolecules consisting of two or more tree-like dendrons, emanating from a single central atom or atomic group called the core. They are comprised of branch cells which are the main building blocks of dendritic structures, (i.e., three-dimensional analogues of repeat units in classical linear polymers), which must contain at least one branch juncture, and which are organized in mathematically precise architectural arrangements, that give rise to a series of regular, radially concentric layers, called generations (G) around the core. Dendrimers must contain at least three different types of branch cells including (i) a core cell, (ii) interior cells, and (iii) surface or exterior cells.

Dendrons are the smallest constitutive elements of a dendrimer that have the same architectural arrangement as the dendrimer itself, but which emanate from a single "trunk" or branch, which may end with a potentially reactive or an inert functional group called the focal group.

Hyperbranched polymers are randomly highly branched macromolecules usually obtained from a "one-shot" polymerization reaction of an AB$_w$ type monomer, i.e., nAB$_w$→—(AB$_w$)$_n$—, where A and B represent mutually reactive functional groups of the monomer. They are usually different from dendrons in that hyperbranched macromolecules are considerably less architecturally regular in their structure, have a lower degree of branching, and as materials, usually have a high degree of polydispersity, in that not all hyperbranched macromolecules of the same hyperbranched polymer are of the same molecular weight or chain length.

Reference may be had, for example, to *Polymer Preprints*, Division of Polymer Chemistry, American Chemical Society, Volume 39, Number 1, Pages 473–474, (March 1998), for a pictorial representation showing in detail the architecture of these types of macromolecular structures, if necessary.

This invention is directed to the synthesis of poly(amidoamine-organosilicon) PAMAM$_x$OS$_y$ and poly(propyleneimine-organosilicon) PPI$_m$OS$_n$ dendrimers, having an hydrophilic PAMAM$_x$ or PPI$_m$ interior containing from 1 to 10 layers x of PAMAM$_x$ branch cells, and from 1 to 5 layers m of PPI$_m$ branch cells, surrounded by an hydrophobic, i.e., oleophilic, OS$_y$ or OS$_n$ exterior, containing at least 2 layers y and n of the OS$_y$ or OS$_n$ branch cells. The synthesis can be performed by two different principal approaches.

The first approach involves an entirely divergent synthesis which includes hydrosilation of a platinum saturated vinyl substituted PAMAM$_x$OS$_{y-1}$ or PPI$_m$OS$_{n-1}$ dendrimer. The second approach is based on coupling reactions between hydrophilic PAMAM$_x$ or PPI$_m$ dendrimers having an appropriate reactive functional group, with either (i) OS$_y$ or OS$_n$ dendrons, or (ii) OS$_y$ or OS$_n$ hyperbranched polymers, each having complementary reactive focal groups.

A representative example of a combination of reactive functional group and reactive focal groups includes the amino —NH$_2$ group for the reactive functional group of the PAMAM$_x$ or PPI$_m$ dendrimer; and reactive focal groups such as acryl, methacryl, haloalkyl, epoxy, and isocyanate, for the dendron or hyperbranched polymer.

In addition to representing poly(amidoamine-organosilicon) dendrimers by the formula PAMAM$_x$OS$_y$, and poly(propyleneimine-organosilicon) dendrimers by the formula PPI$_m$OS$_n$, the products of this invention can also be represented more specifically by formulas such as PAMAM$_x$OS$_y$TMS, PAMAM$_x$OS$_y$TES, PAMAM$_x$OS$_y$TVS, and PAMAM$_x$OS$_y$DMVS, for the poly(amidoamine-organosilicon) dendrimers; and PPI$_m$OS$_n$TMS, PPI$_m$OS$_n$TES, PPI$_m$OS$_n$TVS, and PPI$_m$OS$_n$DMVS, for the poly(propyleneimine-organosilicon) dendrimers. In these formulas, as previously, x and m represent the number of layers of PAMAM$_x$ or PPI$_m$ branch cells in the dendrimer interior; y and n represent the number of OS$_y$ and OS$_n$ branch cells in the dendrimer exterior; while TMS, TES, TVS, and DMVS, represent the type of end group of the OS$_y$ and OS$_n$ exterior of the dendrimer. Thus, TMS represents the non-reactive trimethylsilyl (CH$_3$)$_3$Si— end group, TES represents the non-reactive triethylsilyl (C$_2$H$_5$)$_3$Si— end group, TVS represents the reactive trivinylsilyl (CH$_2$=CH)$_3$Si— end group, and DMVS represents the reactive dimethylvinylsilyl (CH$_3$)$_2$(CH$_2$=CH)Si— end group, respectively.

In one illustration of the concept embodied by the second approach in synthesizing dendrimers according to methods of the invention, there were prepared regular carbosilane dendrons having 2 or 3 layers of ethylsilyl —CH$_2$CH$_2$Si≡ branch cells, chloroalkyl focal groups, and trivinylsilyl end groups. This was carried out by a series of consecutive hydrosilation and Grignard reactions.

In this regard, it should be noted that hyperbranched polymers can be used in preparing these $PAMAM_xOS_y$ and $PPI_mOS_n$ dendrimers, in place of $OS_y$ and $OS_n$ carbosilane dendrons. They can be prepared from organosilicon $AB_w$ type monomers such as carbosilanes, siloxanes, or combinations of carbosilanes and siloxanes, where mutually reactive functional groups A and B of such monomers can be hydrogen, vinyl, or allyl, for example. However, the structure of the resulting dendrimers of various generation, will be less regular, i.e., more randomized, in the outer $OS_y$ and $OS_n$ layers, but essentially the same type of product will be obtained.

The hydrosilation reaction used in this invention employs an organosilicon compound containing —Si—H groups and a co-reagent containing vinyl, allyl, or other corresponding unsaturated group. Such reactions generally involve addition of $\equiv$SiH across double bonds, i.e., $\equiv$SiH+$CH_2$=CH—R'$\rightarrow\equiv$Si$CH_2CH_2$—R'. In some instances, the reaction can also include addition of $\equiv$SiH across triple bonds, i.e., $\equiv$SiH+HC$\equiv$C—R'$\rightarrow\equiv$SiCH=CH—R'.

These reactions require a catalyst to effect addition of the $\equiv$SiH containing organosilicon compound across the co-reagent containing the unsaturation. Suitable catalysts are Group VIII transition metals, i.e., the noble metals. Such catalysts are described, for example, in U.S. Pat. No. 3,923,705 incorporated herein by reference, which shows platinum catalysts in particular. An especially preferred platinum catalyst is Karstedt's catalyst, a material described in Karstedt's U.S. Pat. Nos. 3,715,334 and 3,814,730, also incorporated herein by reference. Karstedt's catalyst, it is noted, is a platinum divinyltetramethyldisiloxane complex, typically containing about one weight percent of platinum or less, carried in a polydimethylsiloxane fluid, or in a solvent such as toluene. Some other especially preferred platinum catalysts are hexachloroplatinic acid and platinum on carbon.

Generally, the reaction conditions under which hydrosilation is carried out according to this invention involve using an appropriate catalyst such as Karstedt's catalyst or hexachloroplatinic acid, in a solvent such as anhydrous tetrahydrofuran, at a temperature in the range of 40–70° C. for about 2–4 hours under nitrogen. Progress and completion of the reaction is usually monitored by Fourier-transform infrared spectroscopy (FTIR).

The Grignard synthesis is a reaction using an organomagnesium compound to transfer organic groups R" to silicon. It can be depicted generally as R"MgX'+X'Si$\equiv$$\rightarrow$R"Si$\equiv$+MgX'$_2$ where X' represents halogen. The general conditions used in this reaction according to the process of the present invention include the use of vinyl or allylmagnesium bromide as the Grignard reagent in THF, under no air, no moisture conditions, at a temperature of about 0° C. To this reaction medium is added a chlorosilane intermediate such as $G_2Cl$ or $G_3Cl$, dropwise over a period of from about 15 minutes to about three hours, after which the ice bath is removed, and the reaction mixture is allowed to heat up. If desired, the reaction mixture can be heated to reflux in order to complete the Grignard reaction, after which it is allowed to cool to room temperature, and the product is isolated.

As Grignard reagent, there can be used vinylmagnesium bromide $H_2C$=CHMgBr, allylmagnesium bromide $H_2C$=CH$CH_2$MgBr, allylmagnesium chloride $H_2C$=CH$CH_2$MgCl, or the like. These reagents are available commercially, typically as solutions in diethyl ether or THF, or the reagent can be specifically prepared for this purpose.

Some representative examples of alkenyl silanes which can be used in making dendrimers according to methods of the invention are chloromethyldimethylvinylsilane $CH_2$=CH$(CH_3)_2$Si$CH_2$Cl, iodomethyldimethylvinylsilane $CH_2$=CH$(CH_3)_2$Si$CH_2$I, chloropropyldimethylvinylsilane $CH_2$=CH$(CH_3)_2$Si$CH_2CH_2CH_2$Cl, iodopropyldimethylvinylsilane $CH_2$=CH$(CH_3)_2$Si$CH_2CH_2CH_2$I, chloromethyldimethylallylsilane $CH_2$=CH$CH_2(CH_3)_2$Si$CH_2$Cl, iodomethyldimethylallylsilane $CH_2$=CH$CH_2(CH_3)_2$Si$CH_2$I, chloropropyldimethylallylsilane $CH_2$=CH$CH_2(CH_3)_2$Si$CH_2CH_2CH_2$Cl, and iodopropyldimethylallylsilane $CH_2$=CH$CH_2(CH_3)_2$Si$CH_2CH_2CH_2$I.

Some representative examples of organo-H-halosilanes which can be used in making dendrimers according to methods of the invention are dihalosilanes such as methyldichlorosilane $HSiCH_3Cl_2$, ethyldichlorosilane $HSiC_2H_5Cl_2$, and phenyldichlorosilane $HSiC_6H_5Cl_2$; and trihalosilanes such as trichlorosilane $HSiCl_3$.

As used herein, the term "organo-H-alkylsilane" is intended to include organo-H-arylsilanes, organo-H-aralkylsilanes (organo-H-arylalkylsilanes), and organo-H-alkarylsilanes (organo-H-alkylarylsilanes).

Some examples of organo-H-alkylsilanes which can be used in making dendrimers according to methods of the invention are trimethylsilane $(CH_3)_3$SiH, triethylsilane $(C_2H_5)_3$SiH, tri-n-propylsilane $(CH_3CH_2CH_2)_3$SiH, triphenylsilane $(C_6H_5)_3$SiH, benzyldimethylsilane $(C_6H_5)CH_2(CH_3)_2$SiH, t-butyldimethylsilane $C_4H_9(CH_3)_2$SiH, diethylmethylsilane $(C_2H_5)_2(CH_3)$SiH, diphenylmethylsilane $(C_6H_5)_2(CH_3)$SiH, phenyldimethylsilane $C_6H_5(CH_3)_2$SiH, and tri-t-butylsilane $(C_4H_9)_3$SiH.

EXAMPLES

The following examples illustrate the invention in more detail.

Example 1 relates to preparation of a vinyl terminated $PAMAM_3OS_1DMVS$ dendrimer precursor generally representative of dendrimers described in U.S. Pat. No. 5,739,218. In particular, Example 1 shows the preparation of a $PAMAM_3OS_1DMVS$ dendrimer from a generation 3 ethylene diamine (EDA) core $PAMAM_x$ dendrimer and chloromethyldimethylvinylsilane. The generation 3 ethylene diamine (EDA) core $PAMAM_x$ dendrimer used in this example was obtained from Dendritech Incorporated. Its molecular characteristics are described in U.S. Pat. No. 5,739,218. In addition, synthetic procedure for making the generation 3 ethylene diamine (EDA) core $PAMAM_x$ dendrimer are described in the *Polymeric Materials Encyclopedia and Macromolecular Symposium* references referred to previously.

Example 1

Chloromethyldimethylvinylsilane (48.54 mmol, 6.54 g), sodium iodide (8.02 g, [NaI]/[ClR]=1.1), 15-Crown-5 ether (2.43 mmol, 0.53 g, 5 percent [—Cl]) represented by the structure shown below

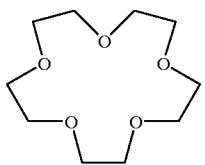

and 10 ml N-methyl pyrrolidinone (NMP) were charged into a three-necked round bottomed flask equipped with a mechanical stirring shaft, a water condenser with a nitrogen inlet at its top, and a stopper. The apparatus was kept under a nitrogen atmosphere, and the reaction mixture was stirred at 60° C. overnight. A generation 3, EDA core PAMAM$_x$ dendrimer was lyophilized in methanol in a round bottomed flask equipped with a Teflon® coated magnetic stirring bar and kept under vacuum overnight. The obtained crispy solid was weighed (4.37 g, 40.45 mmol of —NH reactive groups), and dissolved in 30 ml of NMP. When all of the dendrimer was dissolved (for which a whole day may be necessary in some cases), the solution was added to the reaction mixture, together with sodium bicarbonate (6.13 g, 72.8 mmol), and the newly obtained reaction mixture was stirred at 80° C. for 24 hours. The resulting mixture was filtered to separate the solid salts, and the reaction flask and the solids were rinsed with methanol. Excess solvent was blown away by passing a nitrogen stream, and the obtained product was dialyzed. It was dialyzed first in water (a first batch for 5 hours, and a second batch overnight), and then in methanol (a first batch for 5 hours, and a second batch overnight), using Spectra/Por 7 membranes having molecular weight cut-off (MWCO) of 3500. The product was isolated by first concentrating the solution resulting from the dialysis on a rotovaporizer, and then drying it under vacuum overnight, while stirring with a magnetic stirring bar. This yielded a yellow, crispy, very hygroscopic solid (60.5 percent, 4. 87 g). It was analyzed by $^1$H and $^{13}$C Nuclear Magnetic Resonance (NMR), Gel Permeation Chromatography (GPC) in NMP+0.1 percent LiBr at 80° C., and matrix assisted laser desorption ionization time of flight mass spectrometry (MALDI-TOF MS). $^{13}$C NMR indicated about a 92.8 percent modification of the original PAMAM$_x$ —NH groups. The neat product was unstable, so it was kept refrigerated in methanol.

Example 2, taken in conjunction with Example 1, represents the first embodiment or approach of the method according to the invention, and to the preparation of a PAMAM$_3$OS$_2$TES dendrimer by the hydrosilation of the PAMAM$_3$OS$_1$DMVS dendrimer precursor of Example 1. In particular, Example 2 shows the preparation of a PAMAM$_3$OS$_2$TES dendrimer by the hydrosilation of a PAMAM$_3$OS$_1$DMVS dendrimer with triethylsilane.

Example 2

The PAMAM$_3$OS$_1$DMVS dendrimer obtained in Example 1 was dried overnight in a one-neck round bottomed flask by stirring with a magnetic stirring bar under a partial vacuum at room temperature. In a round bottomed reaction flask equipped with a water-cooled condenser and a nitrogen inlet at the top, 0.76 g (3.54 mmol of vinyl groups) of the dendrimer was dissolved in ethylene glycol diethyl ether (3 ml, dried overnight under CaH$_2$), and a quantity of Karstedt's catalyst [a platinum/divinyltetramethyldisiloxane complex, 3–3.5 percent solution in m-xylene, equal to at least one platinum atom for every 6 dendrimer nitrogens, (1.21 mmol)] was added to the flask. The obtained solution of the dendrimer-noble metal composite was stirred for several minutes, triethylsilane (4.25 mmol, 0.494 g, 0.68 ml) was added, and the resulting reaction mixture was heated under nitrogen to 100° C. It was then stirred for the time of the reaction, which in this case was 2 days. Aliquots were removed from time to time, dissolved in deuterated chloroform CDCl$_3$, and analyzed by $^1$H NMR to monitor the progress of the reaction. This was done by following the disappearance of signals characteristic of the vinyl group. When the reaction was stopped, the obtained mixture was dialyzed in THF using a dialysis bag composed of Spectra/Por 7 membranes, MWCO 3500. At the end of the dialysis, the solvent was evaporated, and the product sample was dried under a partial vacuum at room temperature. A $^{13}$C NMR scan of the product revealed that all of the vinyl groups of the PAMAM$_3$OS$_1$DMVS dendrimer had reacted, and confirmed the expected structure of the PAMAM$_3$OS$_2$TES product.

Examples 3–7 are generally representative, in one aspect or another, of the second embodiment or approach of methods according to the invention.

Example 3 shows the synthesis of a carbosilane dendron with two layers of OS$_y$/OS$_n$ branch cells, a chloromethylene focal group, and triethylsilane TES end groups. The carbosilane dendron prepared in this example has been previously referred to and identified above as the G$_2$Et dendron with a structure corresponding to ClCH$_2$SiMe$_2$CH$_2$CH$_2$Si(CH$_2$CH$_3$)$_3$. The reaction involved in this example is depicted below. In this reaction and in the reactions which follow, X represents chlorine and R represents the —CH$_2$— group.

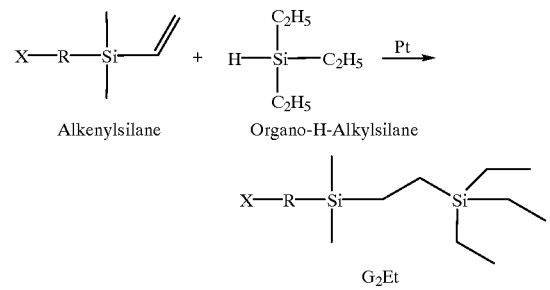

Example 3

Chloromethyldimethylvinylsilane (66.3 mmol; 8.93 g; 10 ml); triethylsilane (66.3 mmol; 7.71 g; 10.6 ml), and anhydrous THF (10 ml), were introduced into a two-necked, round-bottomed reaction flask equipped with a magnetic stirring bar, a condenser with a nitrogen inlet at its top, and a rubber septum. This mixture was stirred under nitrogen, and an aliquot was taken and analyzed by Fourier-transform infrared spectroscopy (FTIR). 0.43 mL (6.10$^{-6}$ mol of Pt) of a platinum divinyltetramethyl disiloxane complex (0.3 percent in m-xylene), was then added, and the reaction mixture was left stirring for 2 hours at 65° C. Aliquots were periodically taken for FTIR analysis in order to follow the progress of the reaction. When no more unreacted ≡SiH groups could be detected, the stirring was stopped, activated carbon was introduced into the mixture, and the heating was continued for 15 minutes at 65° C. The resulting mixture was then filtered, the activated carbon was rinsed with THF, the solvent was evaporated, and the obtained oily product was dried until constant in weight at 50° C. under a partial vacuum. 15.6 g (a 94.0 percent yield) of the product was recovered. The structure was confirmed by $^1$H, $^{13}$C and $^{29}$Si NMR taken in CDCl$_3$.

Example 4 shows the synthesis of a carbosilane dendron with two layers of $OS_y/OS_n$ branch cells, a chloromethylene focal group, and trivinylsilane TVS end groups. The carbosilane dendron prepared in this example has been previously referred to and identified above as the $G_2Vi$ dendron with a structure corresponding to $ClCH_2SiMe_2CH_2CH_2Si(CH_2\!=\!CH_2)_3$. The reactions involved in this example are depicted below.

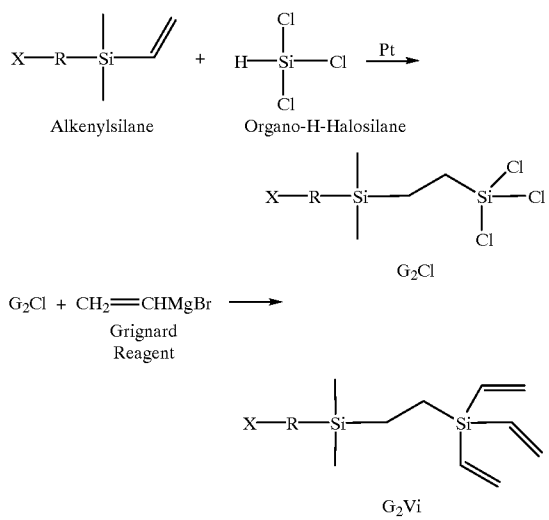

Example 4

All glassware, syringes, and needles, were dried overnight in an electrical oven at 100° C. prior to use. Glassware was assembled still hot from an oven, flame-dried under a partial vacuum, filled with pre-dried nitrogen, and kept under a slight over-pressure during the entire time of this synthesis. Syringes and needles were transferred still hot from the oven into a dessicator and kept there until used. Trichlorosilane was distilled prior to its use ($T_b$=32° C.).

Chloromethyldimethylvinylsilane (17 mmol, 2.29 g, 2.6 ml), anhydrous THF (5 ml), and trichlorosilane (25.5 mmol, 3.43 g, 2.6 ml), were introduced via a syringe and through the septum into a three-necked, round-bottomed flask equipped with a magnetic stirring bar, a nitrogen inlet with a flow control, and a condenser with a balloon at its top. Stirring was started and the mixture was cooled to 0° C. with an ice bath. Then, 0.11 mL ($10^{-4}$ mol Pt/mol Vi) of Karstedt's platinum catalyst, 0.3 weight percent solution in xylenes, was added. After 5 minutes, the ice bath was taken away, and the reaction mixture was allowed to warm up to room temperature. It was kept at that temperature for another 15 minutes, and then heated to 60° C. and stirred for 6 hours. Following this, THF and excess of trichlorosilane were allowed to evaporate under a partial vacuum overnight. The next day, a 250 mL three-necked flask was equipped with a magnetic stirring bar, a septum, a water condenser with a nitrogen inlet at its top, and a pressure equalizing dropping funnel with a septum, and the apparatus was placed under nitrogen. The chlorosilane intermediate previously referred to and identified above as $G_2Cl$ with a structure corresponding to $ClCH_2SiMe_2CH_2CH_2SiCl_3$ was dried overnight, dissolved in 5 ml of anhydrous THF, and cannula transferred into the dropping funnel. 76.5 ml of a 1M solution of vinylmagnesium bromide in THF was introduced to the reaction flask through the septum. The flask was cool ed down to 0° C. with an ice bath, the solution was stirred, and the chlorosilane was introduced drop-wise during 30 minutes. The ice bath was removed, and the reaction mixture was allowed to slowly warm back up to room temperature. During this phase in the synthesis, it was noted that a solid precipitate had formed, and that it hindered stirring of the mixture. However, it was re-dissolved when the mixture was heated to reflux, whereupon the reaction was allowed to progress for 6 hours and twenty minutes, after which time the heating was stopped. The reaction mixture was slowly cooled down to room temperature overnight, and the mixture was filtered through a paper filter to separate the salts that had precipitated. The salts were rinsed with chloroform, and the filtrates were introduced into a dropping funnel and washed several times with water. The organic phase was dried over sodium sulfate, which was then filtered out, and the solvent was evaporated to yield 6.34 g of the product. The product was purified by gas chromatography. The eluant was a 99.2/0.8 percent mixture of hexane and ethyl acetate, and the stationary phase was a silica gel 60 Å, 200–400 mesh. The separation was followed by thin layer chromatography (TLC). The product was the first to come out, providing 2.14 g, which is a yield of 51.4 percent relative to chloromethyldimethylvinylsilane. It was characterized by $^1H$, $^{13}C$, $^{29}Si$ NMR, and GPC in THF.

Example 5 shows the synthesis of a carbosilane dendron with three $OS_y/OS_n$ branch cell layers, a chloromethylene focal group, and triethylsilyl TES end groups. The carbosilane dendron prepared in this example has been previously referred to and identified above as the $G_3Et$ dendron with a structure corresponding to $ClCH_2SiMe_2CH_2CH_2Si[(CH_2CH_2Si(CH_2CH_3)_3)_3]_3$. The reaction in this example is depicted below.

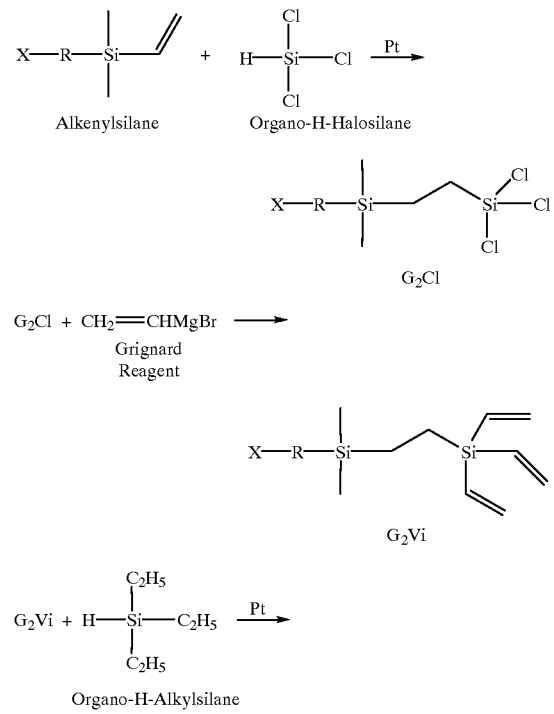

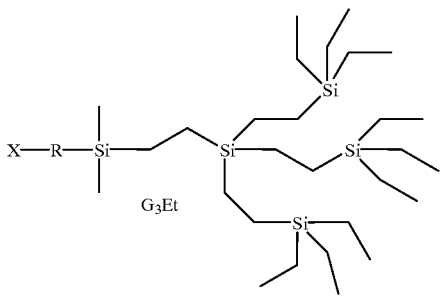

G₃Et

Example 5

The procedure used in this example was similar to the procedure described above in the synthesis of Example 3, except that in this example, the carbosilane dendron G₂Vi of Example 4 (1.52 g, 6.19 mmol) was utilized as the reactant, instead of chloromethyldimethylvinylsilane. The total reaction time was 20 hours. This procedure yielded 2.62 g of the product (71.4 percent), the structure of which was confirmed by $^1$H, $^{13}$C, $^{29}$Si NMR, and GPC in THF.

Example 6 relates to the preparation of a PAMAM₃OS₂TES dendrimer using the carbosilane dendron G₂Et prepared in Example 3. Example 7 relates to the preparation of a PAMAM₃OS₃TES dendrimer using the carbosilane dendron G₃Et prepared in Example 5. The reaction involved in Examples 6 and 7 is generally depicted below.

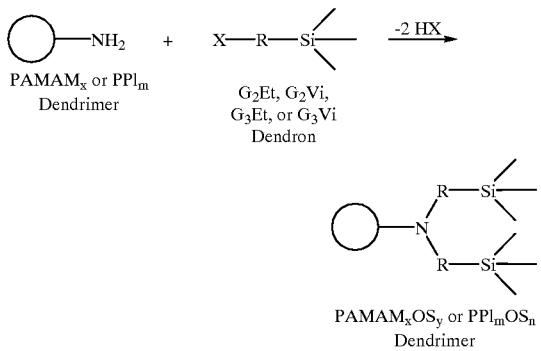

Example 6

In this example, the reaction conditions and the procedures were similar to those described in Example 1, except that the carbosilane dendron G₂Et of Example 3 was used as the reactant in an amount of 8.42 g (33.55 mmol). At the end of the reaction, when the mixture had cooled down, it was filtered and rinsed with chloroform CHCl₃. The organic phase was washed with deionized water until neutral in pH. The obtained mixture was dried over Na₂SO₄, which was then removed by filtration, and the solution was dialyzed for 2 days in hexane. After evaporation of the solvent, the sample was dried under a partial vacuum to yield 9.29 g of the product with a yield of 42.5 percent. The degree of substitution obtained, in terms of the percent of the —NH groups of the original PAMAM$_x$ reagent substituted, was determined by 13C NMR, and found to be 63.5 percent ($M_n$=15,626).

Example 7

In this example, the synthetic conditions and procedures which were used were similar to conditions and procedures described in Example 1. The only difference was that 1.5 g of the carbosilane dendron G₃Et of Example 5 (2.53 mmol) was reacted with 0.45 g of a generation 3 PAMAM$_x$ dendrimer (2.1 mmol of —NH end groups). The reaction mixture was recovered with methylene chloride, filtered, then dialyzed in water, methanol and a mixture of methanol/methylene chloride 50/50. After the solvents were evaporated and the sample dried, 1.5 g of the product was recovered and analyzed by $^1$H, $^{13}$C, $^{29}$Si NMR, and GPC in THF. It was not possible to determine percent of modification of the —NH groups by standard NMR techniques, because the OS$_y$ exterior layer was too extensive.

The dendrimers of the present invention which are inert or nonfunctional materials can be used as components of low surface energy coatings for protection, water and oil repellency, release, and antifoaming. They also afford vapor and flavor transmission barrier properties. The dendrimers with reactive functionality can be used as adhesion promoters, primers, or network precursors. Generally, the dendrimers herein also provide an avenue for delivering active species for use in catalysis, pharmaceutical applications, drug delivery, gene therapy, personal care, and agricultural products.

In soluble or crosslinked form they also provide architecturally precise hosts or matrices for nano-scaled complexes or composites with organic, organometallic, and/or inorganic guests. In crosslinked form, they can act as nanoscopic sponges for adsorption of electrophiles from various media.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A composition comprising a copolymeric dendrimer having a hydrophilic poly(amidoamine) or a hydrophilic poly(propyleneimine) interior and a hydrophobic organosilicon exterior, the copolymeric dendrimer being prepared by reacting a hydrophilic dendrimer having —NH₂ surface groups with an organosilicon compound, the hydrophobic organosilicon exterior of the copolymeric dendrimer containing at least three layers of organosilicon branches.

2. A composition according to claim 1 in which the dendrimer has the formula PAMAM$_x$OS$_y$ or the formula PPI$_m$OS$_n$ wherein PAMAM represents the poly(amidoamine) hydrophilic interior of the dendrimer, PPI represents the poly(propyleneimine) hydrophilic interior of the dendrimer, x is an integer having a value of 1–10 representative of the number of layers of the hydrophilic interior of the PAMAM dendrimer, m is an integer having a value of 1–5 representative of the number of layers of the hydrophilic interior of the PPI dendrimer, OS$_y$ and OS$_n$ represent the hydrophobic organosilicon exterior surrounding the hydrophilic interior of the dendrimer, and y and n are integers having a value of at least three representing the number of branch layers of the hydrophobic organosilicon exterior surrounding the hydrophilic interior of the dendrimer.

3. A composition according to claim 2 in which the organosilicon compound reacted with the hydrophilic dendrimer is an organosilicon dendron or an organosilicon hyperbranched polymer having a reactive group, silalkylene, siloxane, or silalkylenosiloxane branches, and reactive or inert end groups.

4. A composition according to claim 3 in which the reactive group of the organosilicon dendron or the organosilicon hyperbranched polymer is selected from the group consisting of acryl, methacryl, haloalkyl, epoxy, carboxy, ester, acyl halide, and isocyanate.

5. A composition according to claim 4 in which the end group of the organosilicon dendron or the organosilicon hyperbranched polymer is selected from the group consisting of vinylsilyl, allylsilyl, chlorosilyl, alkylsilyl, arylsilyl, alkarylsilyl, and combinations thereof.

6. A composition comprising a copolymeric dendrimer having a hydrophilic poly(amidoamine) or a hydrophilic poly(propyleneimine) interior and a hydrophobic organosilicon exterior, the copolymeric dendrimer being prepared by reacting a hydrophilic dendrimer having —$NH_2$ surface groups with an organosilicon compound to form a copolymeric dendrimer having a hydrophobic organosilicon exterior containing at least one layer of organosilicon branches, the copolymeric dendrimer containing at least one layer of organosilicon branches being further hydrosilated with a co-reagent in the presence of a noble metal catalyst to provide at least one additional layer of organosilicon branch cells on the hydrophobic organosilicon exterior of the copolymeric dendrimer.

7. A composition according to claim 6 in which the noble metal catalyst is complexed, encapsulated, or otherwise non-covalently bonded in the hydrophilic poly(amidoamine) or hydrophilic poly(propyleneimine) dendrimer interior.

8. A composition according to claim 6 in which the dendrimer has the formula $PAMAM_xOS_y$ or the formula $PPI_mOS_n$ wherein PAMAM represents the poly(amidoamine) hydrophilic interior of the dendrimer, PPI represents the poly(propyleneimine) hydrophilic interior of the dendrimer, x is an integer having a value of 1–10 representative of the number of layers of the hydrophilic interior of the PAMAM dendrimer, m is an integer having a value of 1–5 representative of the number of layers of the hydrophilic interior of the PPI dendrimer, $OS_y$ and $OS_n$ represent the hydrophobic organosilicon exterior surrounding the hydrophilic interior of the dendrimer, and y and n are integers having a value of at least two representing the number of branches of the hydrophobic organosilicon layer surrounding the hydrophilic interior of the dendrimer.

9. A composition comprising a copolymeric dendrimer having a hydrophilic poly(amidoamine) or a hydrophilic poly(propyleneimine) interior and a hydrophobic organosilicon exterior, the copolymeric dendrimer being prepared by reacting a hydrophilic dendrimer having —$NH_2$ surface groups with an organosilicon compound selected from the group consisting of an organosilicon dendron and an organosilicon hyperbranched polymer.

10. A composition according to claim 9 in which the dendrimer has the formula $PAMAM_xOS_y$ or the formula $PPI_mOS_n$ wherein PAMAM represents the poly(amidoamine) hydrophilic interior of the dendrimer, PPI represents the poly(propyleneimine) hydrophilic interior of the dendrimer, x is an integer having a value of 1–10 representative of the number of layers of the hydrophilic interior of the PAMAM dendrimer, m is an integer having a value of 1–5 representative of the number of layers of the hydrophilic interior of the PPI dendrimer, $OS_y$ and $OS_n$ represent the hydrophobic organosilicon exterior surrounding the hydrophilic interior of the dendrimer, and y and n are integers having a value of at least one representing the number of branches of the hydrophobic organosilicon layer surrounding the hydrophilic interior of the dendrimer.

11. A composition according to claim 10 in which the organosilicon compound reacted with the hydrophilic dendrimer is an organosilicon dendron or an organosilicon hyperbranched polymer having a reactive group, silalkylene branches, and reactive or inert end groups.

12. A composition according to claim 11 in which the reactive group of the organosilicon dendron or the organosilicon hyperbranched polymer is selected from the group consisting of acryl, methacryl, haloalkyl, epoxy, carboxy, ester, acyl halide, and isocyanate.

13. A composition according to claim 12 in which the end group of the organosilicon dendron or the organosilicon hyperbranched polymer is selected from the group consisting of vinylsilyl, allylsilyl, chlorosilyl, alkylsilyl, arylsilyl, alkarylsilyl, and combinations thereof.

14. A method of making a copolymeric dendrimer having a hydrophilic poly(amidoamine) or a hydrophilic poly(propyleneimine) interior and a hydrophobic organosilicon exterior, the method comprising (i) preparing a copolymeric dendrimer by reacting a hydrophilic dendrimer having —$NH_2$ surface groups with an organosilicon compound to form a copolymeric dendrimer having a hydrophobic organosilicon exterior containing at least one layer of organosilicon branches, and (ii) hydrosilating the copolymeric dendrimer containing at least one layer of organosilicon branches with an organosilicon compound in the presence of a noble metal catalyst, to provide at least one additional layer of organosilicon branches on the hydrophobic organosilicon exterior of the copolymeric dendrimer.

15. A method according to claim 14 in which the dendrimer has the formula $PAMAM_xOS_y$ or the formula $PPI_mOS_n$ wherein PAMAM represents the poly(amidoamine) hydrophilic interior of the dendrimer, PPI represents the poly(propyleneimine) hydrophilic interior of the dendrimer, $OS_y$ and $OS_n$ represent the hydrophobic organosilicon exterior surrounding the hydrophilic interior of the dendrimer, x is an integer having a value of 1–10 representative of the number of layers of the hydrophilic interior of the PAMAM dendrimer, m is an integer having a value of 1–5 representative of the number of layers of the hydrophilic interior of the PPI dendrimer, and y and n are integers having a value of at least two representing the number of branches of the hydrophobic organosilicon layer surrounding the hydrophilic interior of the dendrimer.

16. A method of making a copolymeric dendrimer having a hydrophilic poly(amidoamine) or a hydrophilic poly(propyleneimine) interior and a hydrophobic organosilicon exterior, the method comprising reacting a hydrophilic dendrimer having —$NH_2$ surface groups with an organosilicon compound selected from the group consisting of an organosilicon dendron and an organosilicon hyperbranched polymer.

17. A method according to claim 16 in which the dendrimer has the formula $PAMAM_xOS_y$ or the formula $PPI_mOS_n$ wherein PAMAM represents the poly(amidoamine) hydrophilic interior of the dendrimer, PPI represents the poly(propyleneimine) hydrophilic interior of the dendrimer, x is an integer having a value of 1–10 representative of the number of layers of the hydrophilic interior of the PAMAM dendrimer, m is an integer having a value of 1–5 representative of the number of layers of the hydrophilic interior of the PPI dendrimer, $OS_y$ and $OS_n$ represent the hydrophobic organosilicon exterior surrounding the hydrophilic interior of the dendrimer, and y and n are integers having a value of at least one representing the number of branches of the hydrophobic organosilicon layer surrounding the hydrophilic interior of the dendrimer.

18. A method according to claim 17 in which the organosilicon compound reacted with the hydrophilic dendrimer is an organosilicon dendron or an organosilicon hyperbranched polymer having a reactive group, silalkylene branches, and reactive or inert end groups.

19. A method according to claim 18 in which the reactive group of the organosilicon dendron or the organosilicon hyperbranched polymer is selected from the group consisting of acryl, methacryl, haloalkyl, epoxy, carboxy, ester, acyl halide, and isocyanate.

20. A method according to claim 19 in which the end group of the organosilicon dendron or the organosilicon hyperbranched polymer is selected from the group consisting of vinylsilyl, allylsilyl, chlorosilyl, alkylsilyl, arylsilyl, alkarylsilyl, and combinations thereof.

21. A method of making a dendrimer-noble metal composite of a copolymeric dendrimer having a hydrophilic poly(amidoamine) or a hydrophilic poly(propyleneimine) interior and a hydrophobic organosilicon exterior, the method comprising (i) preparing a copolymeric dendrimer by reacting a hydrophilic dendrimer having —$NH_2$ surface groups with an organosilicon compound, the hydrophobic organosilicon exterior of the copolymeric dendrimer containing at least one layer of organosilicon branches, and (ii) contacting the copolymeric dendrimer containing at least one layer of organosilicon branches with a noble metal catalyst to form a dendrimer-noble metal composite, in which the noble metal catalyst is complexed, encapsulated, or otherwise non-covalently bonded in the hydrophilic poly (amidoamine) or hydrophilic poly(propyleneimine) dendrimer interior.

22. A dendrimer-noble metal composite prepared according to the method defined in claim 21.

* * * * *